(12) United States Patent
Ohtaki

(10) Patent No.: US 6,302,568 B1
(45) Date of Patent: Oct. 16, 2001

(54) HEAD LAMP FOR VEHICLE

(75) Inventor: Sumito Ohtaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/339,111

(22) Filed: Jun. 24, 1999

(30) Foreign Application Priority Data

Jun. 25, 1998 (JP) ................................. 10-179405

(51) Int. Cl.⁷ ........................... F21V 7/00; F21V 17/00
(52) U.S. Cl. .................. 362/546; 362/365; 362/374; 362/375; 362/396; 439/135; 439/345; 439/350; 439/911
(58) Field of Search ..................... 362/546, 365, 362/375, 396; 439/350, 351, 352, 353, 354, 357, 358, 345, 135, 911

(56) References Cited

U.S. PATENT DOCUMENTS

| | | |
|---|---|---|
| 4,742,434 | 5/1988 | Furui et al. |
| 4,920,459 * | 4/1990 | Rothwell, Jr. et al. ............ 362/61 |
| 5,188,444 * | 2/1993 | Makita et al. ..................... 362/80 |
| 5,722,768 * | 3/1998 | Suzuki et al. ..................... 362/265 |
| 5,879,073 * | 3/1999 | Hori et al. ......................... 362/344 |
| 6,089,887 * | 7/2000 | Ozaki .................................. 439/139 |

FOREIGN PATENT DOCUMENTS

| | | |
|---|---|---|
| 9-298001 | 11/1997 | (JP). |
| 10-172303 | 6/1998 | (JP). |
| 10172303A | 6/1998 | (JP). |

OTHER PUBLICATIONS

Safety Plug, C. Sutton, Nov. 1976, IBM Technical Disclosure Bulletin, vol. 19, No. 6.*

* cited by examiner

Primary Examiner—Sandra O'Shea
Assistant Examiner—David V. Hobden

(57) ABSTRACT

A head lamp for a vehicle having a power supply includes a discharge bulb, a reflector for holding the discharge bulb, a lamp body for accommodating the reflector, the lamp body having an opening in the reflector for replacing the discharge bulb, a back cover coupled to the lamp body to close the opening, a starting circuit coupled to the discharge bulb for lighting the discharge bulb, a first connector coupled to the starting circuit, a second connector coupled to the power supply; and a detachable lock member fastening the back cover to the first and second connectors, wherein the lock member is covered by the first and second connectors when the connectors are coupled with each other, so that the back cover cannot be open before disengaging the lock member.

19 Claims, 4 Drawing Sheets

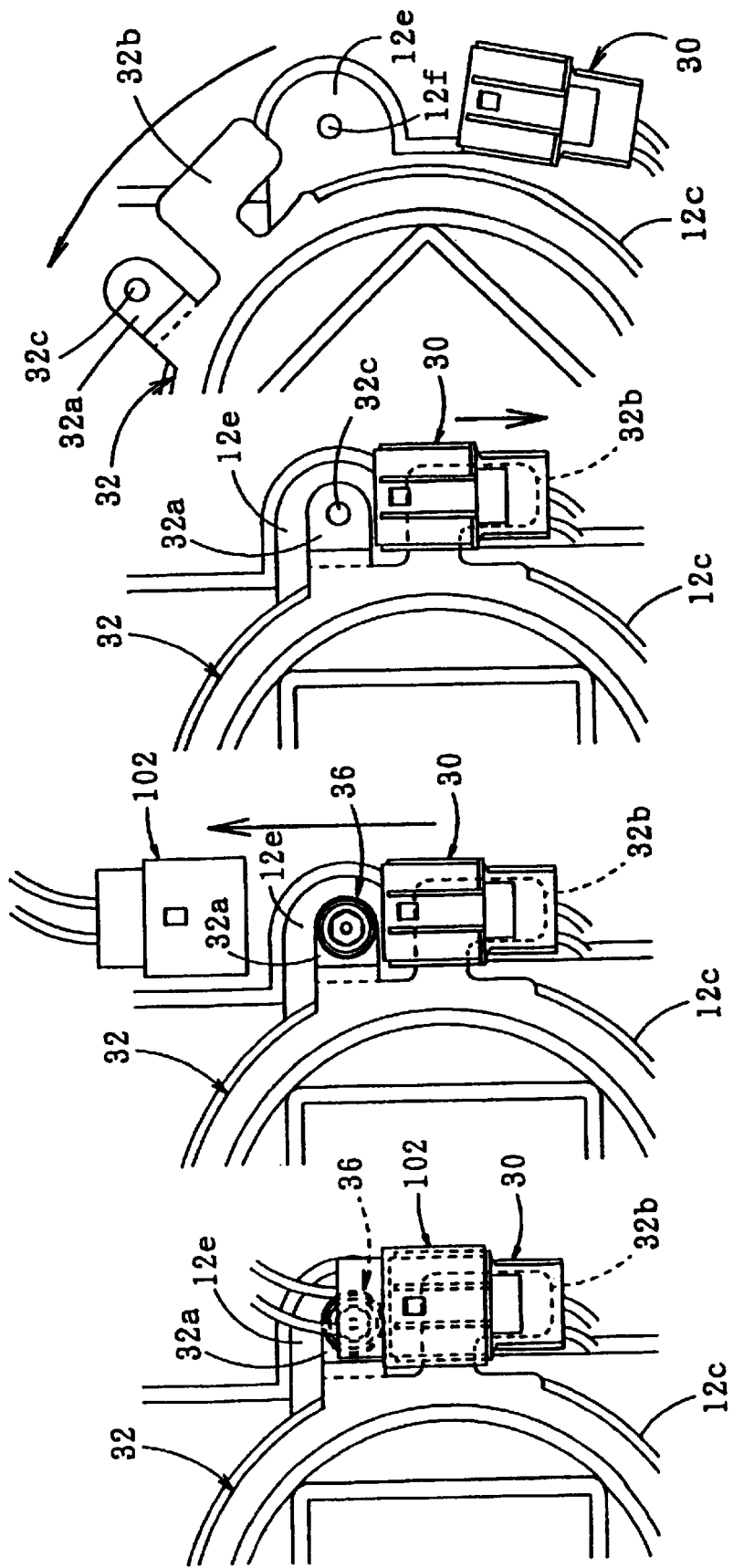

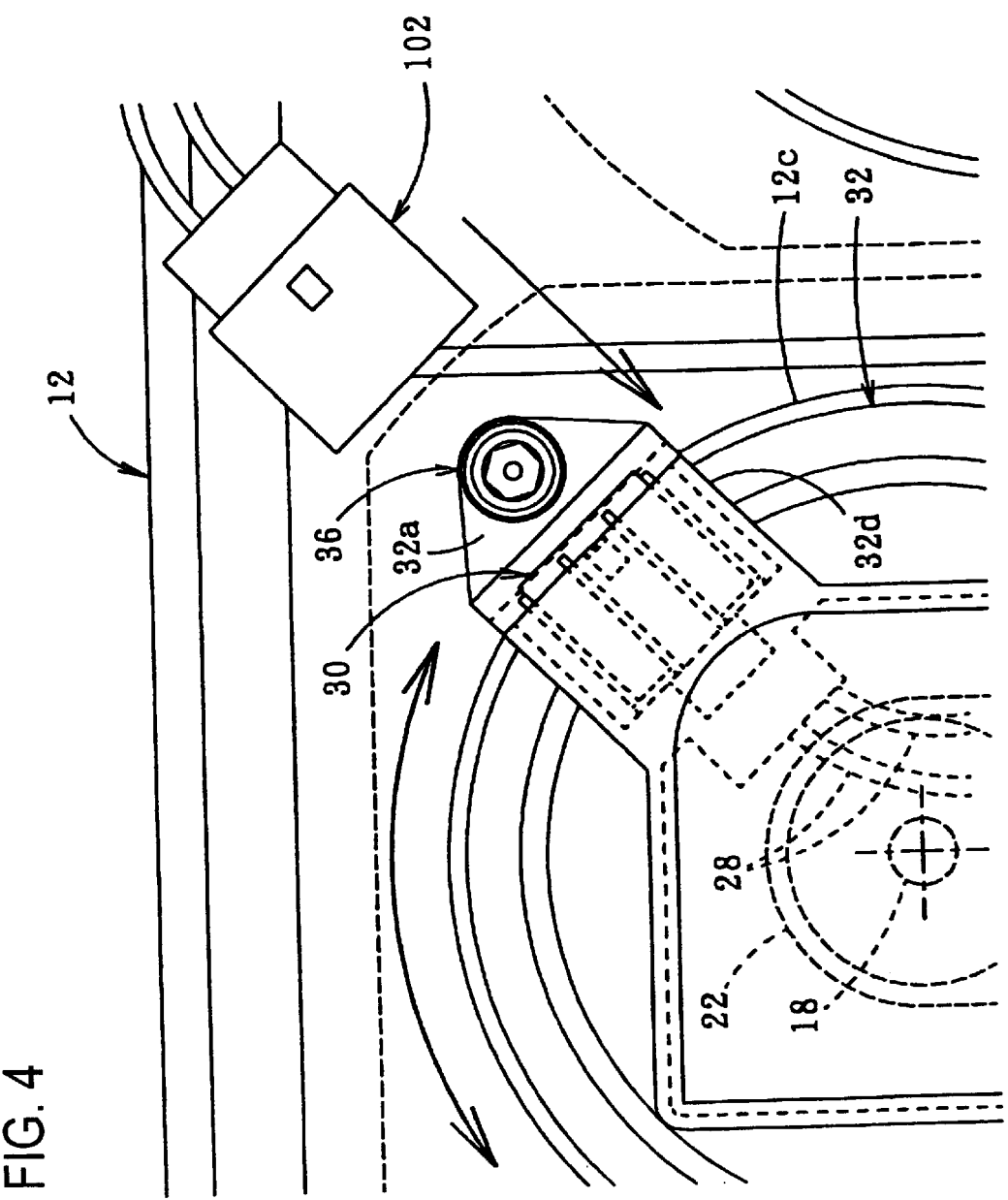

HEAD LAMP FOR VEHICLE

This application claims the benefit of Japanese Application No. P. Hei. 10-179405 filed Jun. 25, 1998, which is hereby incorporated by reference.

BACKGROUND OF THE INVENTION

1. Field of the Invention

The present invention relates to a head lamp for a vehicle, and more particularly, to a head lamp for a vehicle having a discharge bulb. Although the present invention is suitable for a wide scope of applications, it is particularly suitable for preventing a user from replacing a discharge bulb while battery power is supplied to a starting circuit.

2. Description of the Related Art

Recently, a discharge bulb has been increasingly employed as a light source of a head lamp for a vehicle because of its high luminance irradiation capability. In order to light up the discharge bulb, a high voltage has to be applied to the discharge bulb. A power supply voltage may be as high as 20 kV in supplying the voltage to the discharge bulb through a high voltage cord. A starting circuit is provided between the discharge bulb and a battery power supply for the head lamp having the discharge bulb.

Generally, an opening portion for replacing a discharge bulb is formed in a lamp body which accommodates the discharge bulb such that the bulb is taken out from or inserted into the lamp body through the opening portion for the bulb replacement. Except when the bulb is replaced, the opening portion is covered with a back cover for preventing dust or the like from entering into the lamp body.

In the head lamp for a vehicle having the discharge bulb as described above, a user inserts his/her fingers into the lamp body through the opening portion for replacing the bulb. In this occasion, the user's fingers may touch a high voltage cord, and a socket for connecting the discharge bulb. Assuming that power is continuously supplied to the discharge bulb during the bulb replacement, the user would be in danger of being exposed to the high voltage in the case where the high voltage cord is broken or the user touches a terminal portion of the socket with his/her the fingers. Therefore, there is a need for a safe device to prevent the user from replacing the bulb while the battery power is supplied to the starting circuit.

SUMMARY OF THE INVENTION

Accordingly, the present invention is directed to a head lamp for a vehicle that substantially obviates one or more of problems due to limitations and disadvantages of the related art.

An object of the present invention is to provide a head lamp for vehicle having a discharge bulb, which is capable of preventing bulb replacement doing supply of power to the starting circuit.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a head lamp for a vehicle having a power supply includes a discharge bulb, a reflector for holding the discharge bulb, a lamp body for accommodating the reflector, the lamp body having an opening in the reflector for replacing the discharge bulb, a back cover attached to the lamp body to close the opening, a starting circuit coupled to the discharge bulb for lighting the discharge bulb, a first connector coupled to the starting circuit, a second connector coupled to the power supply, and a detachable lock member fastening the back cover to the first and second connectors, wherein the lock member is covered with the first and second connectors when the connectors are coupled with each other, so that the back cover cannot be opened before disengaging the lock member.

In another aspect of the present invention, a head lamp for a vehicle having a power supply and a starting circuit in includes a discharge bulb, a lamp body for holding the discharge lamp, the lamp body having an extending portion, a back cover coupled to the lamp body, the back cover having a lock member receiving portion and a connector engaging portion, first and second connectors coupled to the starting circuit and the power supply, respectively, and a lock member fastening the back cover to the first and second connectors through the extending portion, the lock member receiving portion, and the connector engaging portion, wherein the lock member is covered by the first and second connectors when the connectors are coupled with each other, so that the back cover cannot be opened before disengaging the locking members and the connectors.

In a further aspect of the present invention, a head lamp for a vehicle having a power supply and a starting circuit includes a discharge bulb, a lamp body for holding the discharge lamp, the lamp body having an extending portion, a back cover coupled to the lamp body, the back cover having a lock member receiving portion and a first connector coupled to the starting circuit, a second connector coupled to the power supply, and a lock member fastening the back cover to the first and second connectors, wherein the lock member is covered by the first and second connectors when the connectors are coupled with each other, so that the back cover cannot be opened before disengaging the locking members and the connectors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

In the drawings:

FIGS. 3A to 3D are partial views enlarging the portion A to illustrate the procedure steps of removing a back cover in FIG. 1.

FIG. 4 is a partial view illustrating a second embodiment of the present invention.

DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
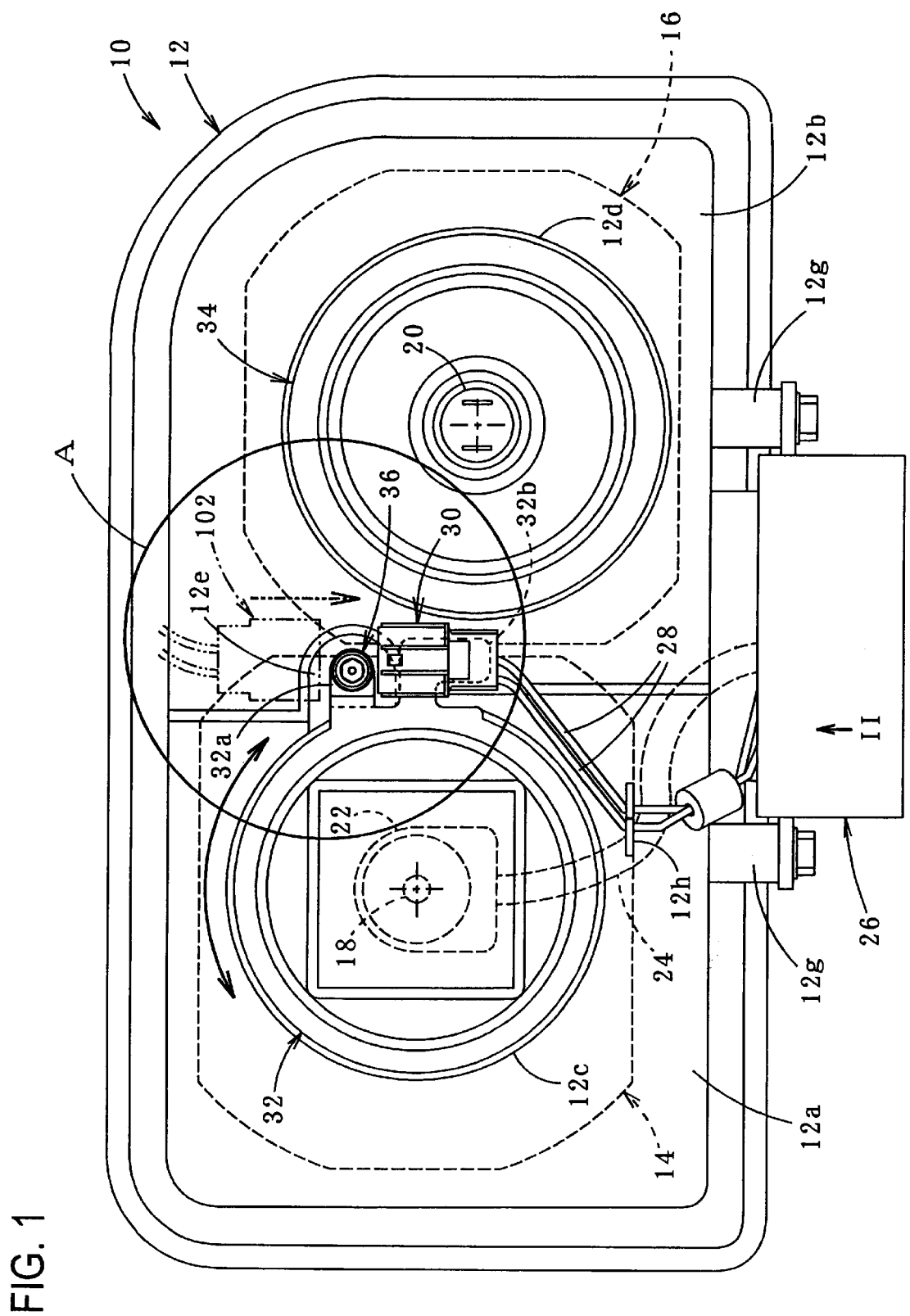
FIG. 1 is a rear view illustrating a head lamp for a vehicle according to a first embodiment of the present invention.
Figure 2:
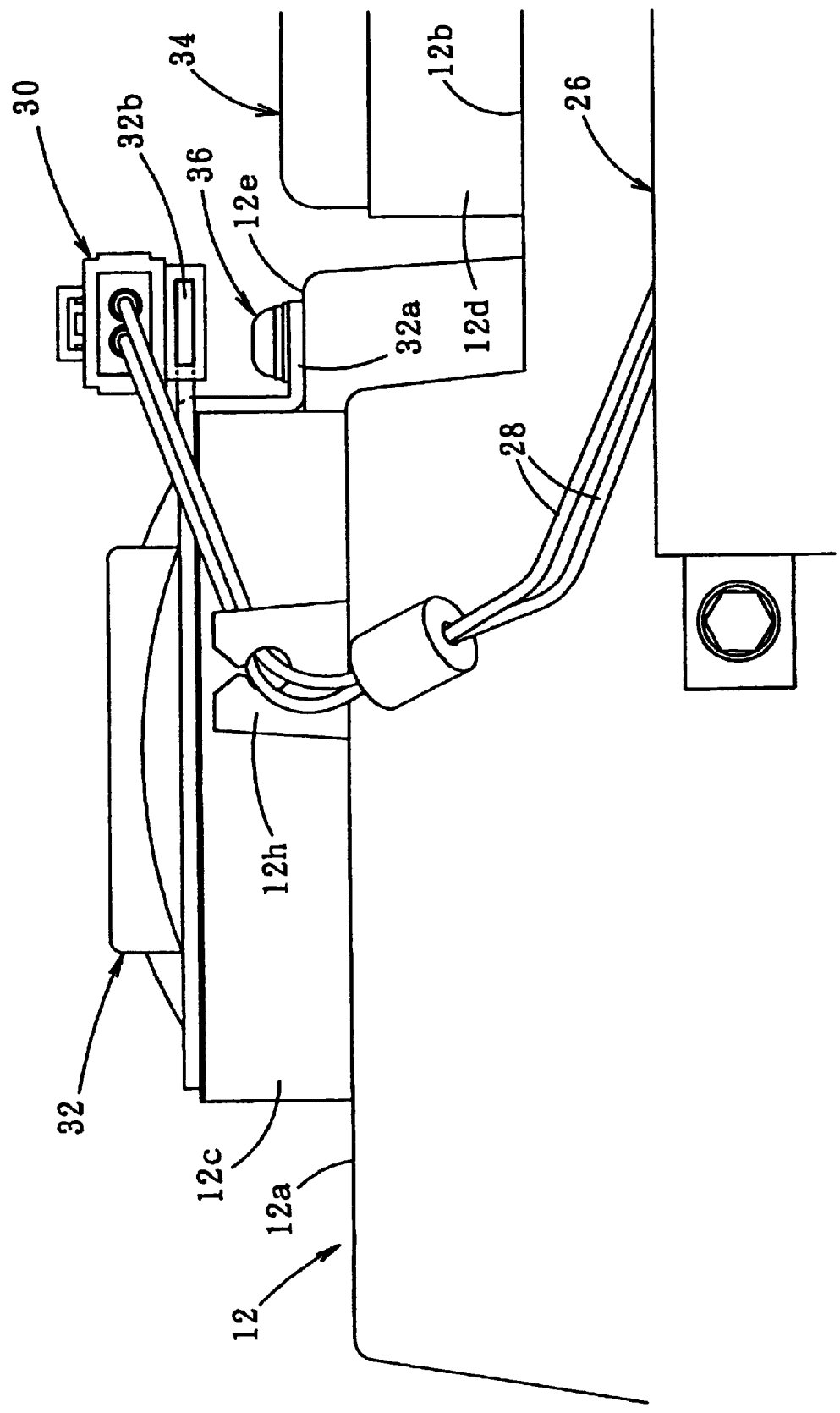
FIG. 2 is a directional view from the direction of II of FIG. 1.

Initially referring to FIG. 1, a head lamp 10 for a vehicle according to the present invention includes a pair of right and left reflectors 14 and 16 in a space defined by a lamp body 12 and a lens (not shown). A discharge bulb 18 (for example, a metal halide bulb) is attached on the reflector 14, and a halogen bulb 20 is fastened on the reflector 16.

The discharge bulb 18 requiring a high voltage for lighting is connected to a starting circuit unit 26 (or starting circuit) through a socket 22 and a high voltage cord 24. Further, the discharge bulb 18 is connected to a connector 30 at the starting circuit side through a feeding cord 28. The starting circuit unit 26 is fixed by a screw to a boss 12g formed at the bottom of the lamp body 12.

The reflector 14 is offset to the rear of the reflector 16. Correspondingly, at the rear portion of the lamp body 12, a rear portion (hereinafter referred to as a first rear portion 12a) of the reflector 14 is offset to the rear of a rear portion (hereinafter referred to as a second rear portion 12b) of the reflector 16. An engaging piece 12h for securely engaging the feeding cord 28 is formed at the lower portion of the first rear portion 12a.

At the first and second rear portions 12a and 12b of the lamp body 12, a pair of left and right cylindrical openings 12c and 12d project backward. The opening 12c is an opening portion for replacing the discharge bulb 18 while the opening 12d is an opening portion for replacing the halogen bulb 20. Moreover, a first back cover 32 formed of a synthetic resin is attached to the lamp body 12 to close the opening 12c. A second back cover 34 formed of rubber is attached to the lamp body 12 to close the opening 12d.

The first back cover 32 is attached to the lamp body 12 at a rear end portion of the opening 12c, and it is pivotally rotatable (as shown in arrow in FIG. 1) with respect to the central axis of the opening 12c. The second back cover 34 is attached to the lamp body 12 to cover the opening 12d at the rear end portion.

An extending portion 12e is formed in the vicinity of the opening 12c and at the position close to and slightly above from the surface of the opening 12d. A screw fastening hole 12f (shown in FIG. 3D) is formed at the extending portion 12e.

At the outer periphery of the first back cover 32, a lock-screw receiving piece 32a and a connector engaging piece 32b (or connector supporting portion) are integrally formed therewith. The lock-screw receiving piece 32a having a tip is formed to have a crank-like shape so as to extend forward. A screw receiving hole 32c (shown in FIG. 3D) is formed at the tip. When the first back cover 32 is pivotally rotating in a clockwise direction with respect to the opening 12c to reach a predetermined closing position, the lock-screw receiving piece 32a moves to a position that is substantially the same level as the extending portion 12e. The screw fastening hole 12f also becomes coaxial with the screw receiving hole 32c. The first back cover 32 in the closing position cannot be released from the lamp body 12 because it is fastened by a lock screw 36 (lock member) into the screw fastening hole 12f through the screw receiving hole 32c. For example, the lock member may be a detachable structure such as a spring, screw, or clip. The lock screw 36 has a special structure that can be loosened only by using a special-purpose screwdriver. This structure may prevent a user from unintentionally removing the first back cover 32.

The connector engaging piece 32b is formed to have an inverted L-like shape at the position in the vicinity of the lower portion of the lock-screw receiving piece 32a so as to project horizontally. The connector engaging piece 32b is fixed and supported by the first connector 30 at the starting circuit side from the bottom.

A second connector 102 at the battery power supply side mounted on the vehicle body is coupled to the first connector 30. Since the first connector 30 at the starting circuit side is fixed and supported in the upward direction to the connector engaging piece 32b, the second connector 102 at the battery power supply side is coupled to the first connector 30 at the starting circuit side from the upward direction. Thus, the rear side of the lock screw 36 located around an upper portion of the first connector 30 at the starting circuit side is covered by the second connector 102 at the battery power supply side. In other words, at least one of the connector at the starting circuit side and the connector at the battery power supply side is located at the position where the lock screw 36 cannot be unlocked. Therefore, a tip of the screwdriver cannot be inserted into the lock screw 36 from the rear side. As a result, the lock screw 36 cannot be loosened.

Hereinafter, the procedure steps of removing the first back cover 32, which are the necessary steps before replacing the discharge bulb 18, will be described.

FIG. 3A is a partial view of FIG. 1 illustrating the state in which the second connector 102 at the battery power supply side is connected to the first connector 30 at the starting circuit side. Beginning from this state, as shown in FIG. 3B, the second connector 102 at the battery power supply side is disconnected from the first connector 30 at the starting circuit side. Then, the lock screw 36 is loosened and removed using a screwdriver. Thereafter, as shown in FIG. 3C, the first connector 30 at the starting circuit side is pulled out from the connector engaging piece 32b. As shown in FIG. 3D, the first back cover 32 is pivotally rotated counterclockwise and removed from the lamp body 12, such that the opening 12c is exposed. In this state, the discharge bulb 18 can be replaced. After the bulb replacement is completed, the same procedure is performed in the reverse order.

As described above in the present embodiment, the lock screw 36 fixing the back cover 32 is covered by the second connector 102 at the battery power supply side coupled to the first connector 30 at the starting circuit side. The lock screw 36, thus, cannot be removed and the first back cover 32 cannot be detached as long as these are connected to each other. Accordingly, the bulb cannot be replaced while supplying power to the starting circuit unit 26, which may eliminate the risk of causing unexpected injury to the user as well as protect the user with excellent reliability.

It should be noted that the head lamp 10 for a vehicle according to the present embodiment is configured such that the lock screw 36 can be removed only with a special tool, thus further ensuring safety. As described above, the bulb cannot be replaced during supplying of the battery power. Further, safety at the time of bulb replacement in a repair shop can also be sufficiently improved since the special tool should be used in disengaging the screw.

Moreover, the first back cover 32 is attached to the lamp body 12 to be pivotally rotatable with respect to the central axis of the opening 12c. Therefore, the release of the first back cover 32 can be prevented by using the lock screw 36 having a simple structure such as a lock means.

Further, since the first connector 30 at the starting circuit side is fixed and supported by the connector engaging piece 32b which is integrally formed with the first back cover 32, the lock screw 36 can be reliably covered while the connectors are coupled. In addition, the structure for supporting the connector can be simplified, and easily located in the vicinity of the lock screw 36.

FIG. 4 is a partial view of the portion A of FIG. 1 illustrating a second embodiment of the present invention.

As shown FIG. 4, the first back cover 32 has an insertion portion 32d that is inclined (e.g. rotated about 45 degrees from the first embodiment) toward the second connector 102 at the battery power supply side. Within the insertion portion 32d, the first connector 30 at the starting circuit side is integrally formed with the first back cover 32. Since the connector supporting portion 12b in the second embodiment is not required, the connector supporting portion 12b is not formed in the first back cover 32. As a result, functions and effects similar to the first embodiment can be realized with a reduced number of parts.

In the second embodiment, the feeding cord 28 is drawn throughout the lamp body 12. In the case where the starting circuit unit 26 is disposed within the lamp body 12, the feeding cord 28 does not extend out of the lamp body 12. Thus, a receiving hole for extending the feeding cord 28 out of the lamp body 12 is required in the lamp body 12. Further, a structure for sealing the receiving hole is omitted.

It will be apparent to those skilled in the art that various modification and variations can be made in the headlamp for a vehicle of the present invention without departing from the spirit or scope of the inventions. Thus, it is intended that the present invention cover the modifications and variations of this invention provided they come within the scope of the appended claims and their equivalents.

What is claimed is:

1. A head lamp for a vehicle comprising:

a discharge bulb;

a reflector for holding the discharge bulb;

a lamp body for accommodating the reflector, the lamp body having an opening behind the reflector for replacing the discharge bulb;

a back cover coupled to the lamp body for closing the opening;

a starting circuit coupled to the discharge bulb;

a first connector coupled to the starting circuit;

a second connector connected to a power supply; and a detachable lock member fastening the back cover to the lamp body, wherein the detachable lock member is covered by the first and second connectors when the connectors are coupled with each other, so that the back cover cannot be opened before disengaging the detachable lock member.

2. The head lamp according to claim 1, wherein the back cover is pivotally rotatable with respect to the central axis of the opening.

3. The head lamp according to claim 1, wherein the back cover has a connector engaging portion for fixing and supporting the connector at a side for the starting circuit.

4. The head lamp according to claim 1, wherein the back cover has a lock member receiving portion for receiving the lock member at a side for the power supply.

5. The head lamp according to claim 4, wherein the lock member receiving portion has a hole for passing the lock member.

6. The head lamp according to claim 4, wherein the lock member receiving portion has an inverted "L" shape.

7. The head lamp according to claim 1, wherein the lamp body has an extending portion for engaging the connectors with the back cover.

8. The head lamp according to claim 7, wherein the lamp body has a hole for fastening the lock member.

9. The head lamp according to claim 1, wherein the detachable lock member includes at least one of a screw, a spring, and a clip.

10. A head lamp for a vehicle comprising:

a discharge bulb;

a lamp body for holding the discharge bulb, the lamp body having an extending portion;

a back cover coupled to the lamp body, the back cover having a lock member receiving portion and a connector engaging portion;

first and second connectors coupled to a starting circuit and a power supply, respectively; and a lock member fastening the back cover to the lamp body, the lock member receiving portion, and the connector engaging portion, wherein the lock member is covered by the first and second connectors when the connectors are coupled with each other, so that the back cover cannot be opened before disengaging the lock member and the connectors.

11. The head lamp according to claim 10, wherein the back cover is pivotally rotatable with respect to the central axis of the opening in the lamp body.

12. The head lamp according to claim 10, wherein the lock member receiving portion has a hole for passing the lock member.

13. The head lamp according to claim 10, wherein the lock member receiving portion has an inverted "L" shape.

14. The head lamp according to claim 10, wherein the lamp body has a hole for fastening the lock member.

15. The head lamp according to claim 10, wherein the lock member includes at least one of a screw, a spring, and a clip.

16. A head lamp for a vehicle comprising:

a discharge bulb;

a lamp body for holding the discharge bulb, the lamp body having an extending portion;

a back cover attached to the lamp body, the back cover having a lock member receiving portion and a first connector coupled to a starting circuit;

a second connector coupled to a power supply; and a lock member fastening the back cover to the lamp body, wherein the lock member is covered by the first and second connectors when the connectors are coupled with each other, so that the back cover cannot be opened before disengaging the lock member and the connectors.

17. The head lamp according to claim 16, wherein the lock member receiving portion and the first connector are formed at an upper right portion of the back cover.

18. The head lamp according to claim 16, wherein the back cover is pivotally rotatable with respect to the central axis of the lamp body.

19. The head lamp according to claim 16, wherein the lock member includes at least one of a screw, a spring, and a clip.

* * * * *